United States Patent [19]

Wang et al.

[11] 4,414,045
[45] Nov. 8, 1983

[54] HIGH SPEED ULTRASONIC BONDING

[75] Inventors: Kenneth Y. Wang, Greensboro, N.C.; Berlie R. Hill, Cana, Va.; Marvin J. Pinson, Jr., Greensboro, N.C.

[73] Assignee: Burlington Industries, Inc., Greensboro, N.C.

[21] Appl. No.: 350,823

[22] Filed: Feb. 22, 1982

[51] Int. Cl.³ .................... B29C 27/08; B32B 31/20
[52] U.S. Cl. .................... 156/73.2; 156/181; 156/296; 156/580.1; 156/580.2; 264/23; 425/174.2
[58] Field of Search .................. 156/73.1, 73.2, 62.2, 156/181, 296, 580.1, 580.2; 264/23; 425/174.2

[56] References Cited

U.S. PATENT DOCUMENTS

| | | | |
|---|---|---|---|
| 3,733,238 | 5/1973 | Long et al. | 156/73.1 |
| 3,836,413 | 9/1974 | Frohlich et al. | 156/73.2 |
| 4,259,399 | 3/1981 | Hill | 428/288 |
| 4,311,540 | 1/1982 | Hill | 156/73.1 |

*Primary Examiner*—Michael G. Wityshyn
*Attorney, Agent, or Firm*—Cushman, Darby & Cushman

[57] ABSTRACT

A method and apparatus provide the production of a non-woven fabric from a batt of random, loose, ultrasonically fusible fibers at high speed (e.g. greater than 50 meters/minute). A plurality of ultrasonic welding machines are spaced from each other in a batt feed direction, and produce a fabric having a predetermined number of primary bonding points per unit area. The batt is fed in the feed direction into operative engagement, in turn, with each of the ultrasonic welding machines, while energy is supplied to each of the machines. Each of the machines effects bonding of substantially less than all of the predetermined number of primary bonding points, but so that together the machines provide all of the predetermined number of bonding points. Each machine includes an anvil roller and a purality of horns, which may be disposed in-line with each other and spaced from each other in a dimension transverse to the feed direction. Each machine preferably bonds the same number of the bonding points per unit area, and each anvil roller may have a pattern identical to the patterns of the anvil rollers of the other machines, only offset in the dimension perpendicular to the feed direction.

20 Claims, 9 Drawing Figures

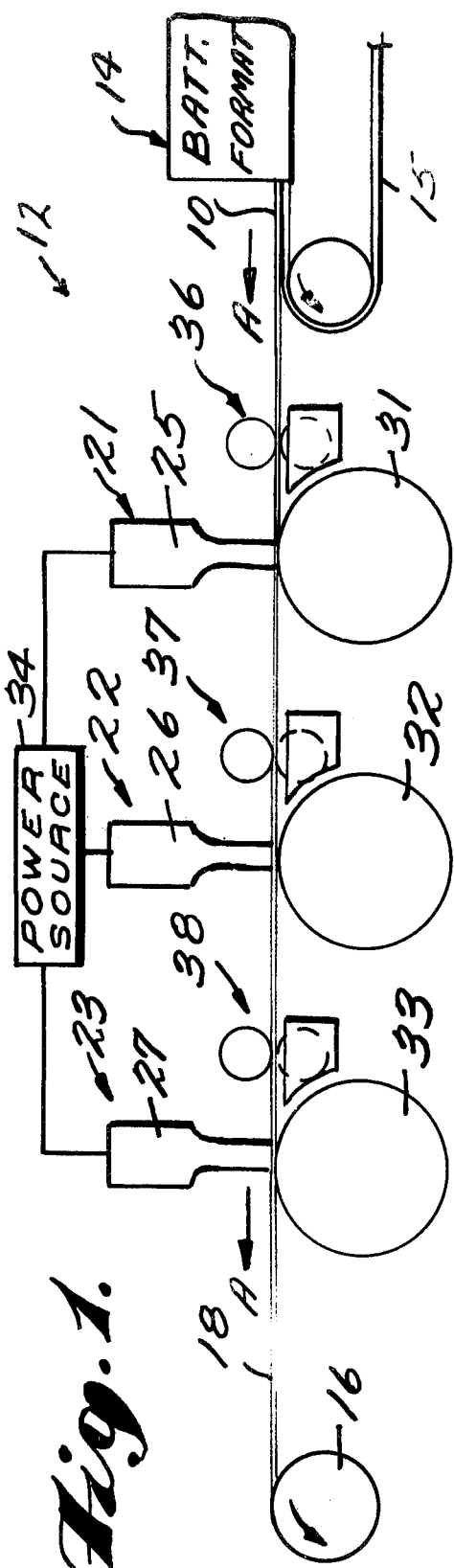
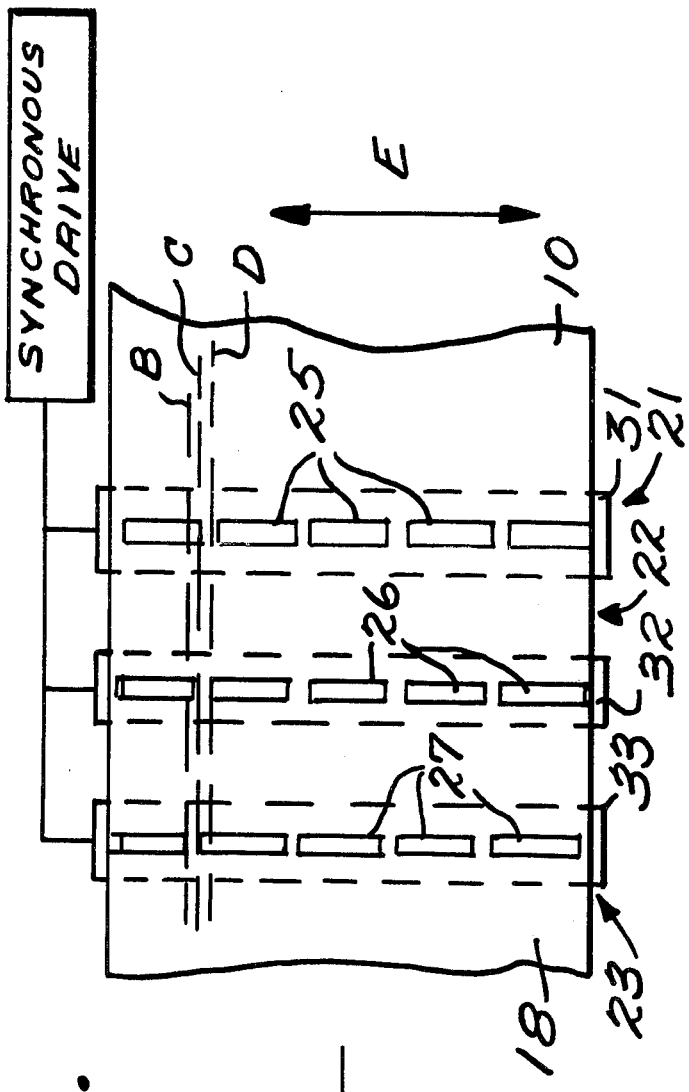

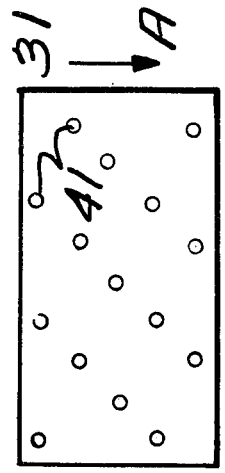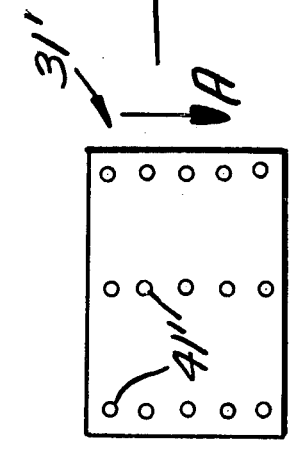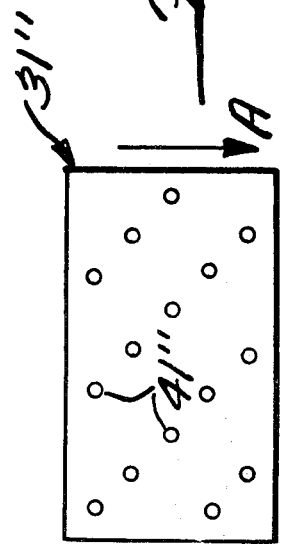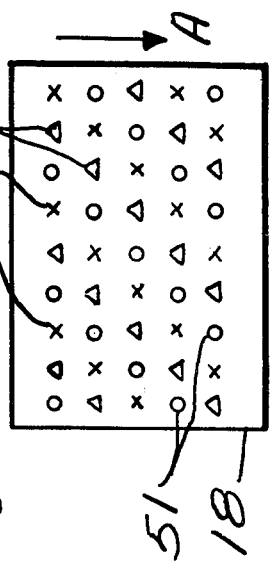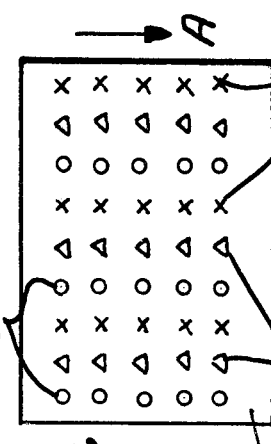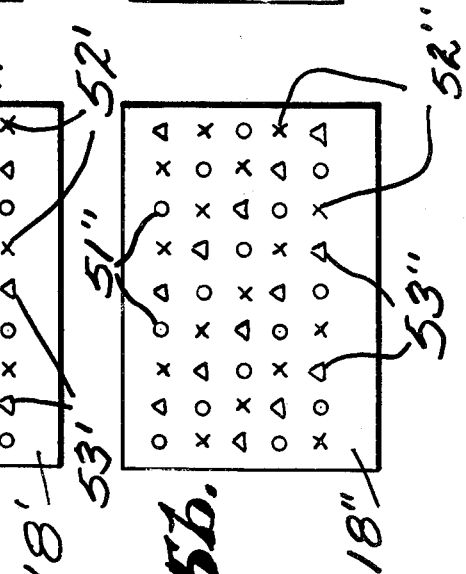

HIGH SPEED ULTRASONIC BONDING

BACKGROUND AND SUMMARY OF THE INVENTION

In the commercial production of non-woven fabrics from a batt of random, loose, ultrasonically fusible fibers, after formation the batt is passed between a plurality of staggered horns of an ultrasonic welding machine, between the horns and an anvil roller having a pattern of projections formed thereon. Typical conventional apparatus is disclosed in copending application Ser. No. 290,714 filed Aug. 6, 1981 now U.S. Pat. No. 4,394,208 (the disclosure of which is hereby incorporated by reference herein), and copending application Ser. No. 145,833 filed May 1, 1980 now U.S. Pat. No. 4,311,540 (the disclosure of which is hereby incorporated by reference herein). By providing the proper pattern, spacing, and size of the projections on the anvil roller, it is possible to obtain a non-woven fabric that has a textile-like hand and drape, with high tensile strength, elongation, and tear strength properties. A high density and large number of primary bond points are uniformly distributed over the entire surface of the web, with each individual bond point maintained at the smallest practical size so that the total percentage of primary-bonded area of the fabric is maintained low.

Each ultrasonic power unit emits a certain amount of ultrasonic vibration energy to the web. This energy absorption is time dependent in the sense that the total power must be distributed to the entire surface of the web. For a given density of welding area, such as 10% of the total surface area, increasing the process speed draws higher and higher power until the maximum safe continuous power capability is reached for the particular unit. With this power limitation, one can either vary the speed or the density of welding. At the maximum power setting, increasing the speed of the process by two fold will require decreasing the density of the weld area by 50%, say from a 10% surface area to a 5% surface area of welding.

While the practice of such conventional procedures results in the production of a desirable non-woven fabric, the necessity of providing a high density of bond points each with the smallest practical size makes it extremely difficult to achieve high production speeds. For instance, typical production speeds are within the range of 10–30 meters/minute. When high speed commercially available batt formation equipment is utilized to form the batt of random, loose, ultrasonically fusible fibers, the speed of production of the non-woven fabric is limited by the speed of the ultrasonic bonding equipment, the batt-formation apparatus being capable of forming a suitable batt at a much higher speed than 50 meters/minute.

According to the present invention, a method and apparatus are provided that overcome the speed limitations inherent in conventional production of non-woven webs with ultrasonic bonding equipment. According to the present invention, it is possible to form non-woven fabric with suitable textile-like hand and drape, and with high tensile strength, elongation, and tear strength properties at high speed (e.g. greater than 50 meters/minute), so that the ultrasonic bonding equipment is not a limiting apparatus in the production of non-woven fabric ultrasonically. This is accomplished, according to the present invention, primarily by providing a plurality (e.g. 3) of ultrasonic welding machines in series, spaced from each other in the feed direction of the batt. Each welding machine effects bonding of only a portion of the primary bonds formed in the fabric, therefore the limitations inherent in utilization of high density bonding equipment are avoided, with resultant increase in fabric production speed.

According to one aspect of the present invention, a method of producing a non-woven fabric from a batt of random, loose, ultrasonically fusible fibers is provided, the fabric having a predetermined number of primary bonding points per unit area formed with a plurality of ultrasonic welding machines, each machine spaced from each other in a batt feed direction. The method steps are:

(a) Feeding the batt fibers in a batt feed direction into operative engagement, in turn, with each of the ultrasonic welding machines.

(b) Supplying energy to each of the ultrasonic welding machines to effect formation of primary bonding points therewith. And, (c) effecting bonding of substantially less than all of the predetermined number of primary bonding points with each of the ultrasonic welding machines, but so that together the machines provide all of the predetermined number of bonding points desired. The number of ultrasonic welding machines provided is "x", wherein "x" is a positive integer greater than one; and preferably step (c) is practiced so that each of the machines bonds approximately (n/x) primary bonding points, wherein "n" is the predetermined desired number of bonding points per unit area. Thus where three ultrasonic welding machines are provided, each machine preferably effects bonding of about one-third of the primary bonding points. Preferably each of the machines applies a pattern of primary bonds (e.g. a straight-line pattern, or a helical pattern) to the batt that is the same as the pattern applied by the other machines, with each pattern offset from the other pattern in a dimension perpendicular to the batt feed direction.

According to another aspect of the present invention, apparatus for effecting the formation of a non-woven fabric is provided. The apparatus includes a plurality of ultrasonic welding machines, each machine including a set of horns and an anvil roller. Means are provided for mounting the welding machines so that they are spaced from each other in a direction of batt feed so that the batt may pass between the horns and anvil of each machine. Means are provided for transporting the batt in the feed direction between the horns and anvil of each of the machines; and means are provided for supplying energy, to effect ultrasonic bonding, to each of the machines at the same time. Preferably each of the anvil rollers has Y raised projections formed thereon, in a particular pattern, and the non-woven fabric produced has approximately "n" primary bonding points per unit area, wherein "n" is a positive integer evenly divisible by Y. The relationship $(n/Y)=x$ is approximately true, each machine effecting bonding of a proportional number of the bonding points.

Utilizing the apparatus described above, it is possible to obtain suitable non-woven fabric production without providing any special configuration of the horns (such as in U.S. Pat. No. 4,146,416 or German Off. 22 59 203), and without requiring special equipment for staggering a plurality of horns associated with each anvil roller (such as in U.S. Pat. No. 3,733,238). This provides for much simpler apparatus for mounting of the horns, and easier access for replacement, repair, or the like thereof. Utilizing the apparatus according to the invention, the horns of each of the welding machines may be placed in-line with each other and spaced from each other a small distance in a dimension substantially transverse to the batt feed direction. The horns of at least one of the machines are staggered along the dimension substantially transverse to the feed direction with respect to the horns of at least one of the other machines, so that essentially every portion of the batt across the width thereof passes in operative association with at least one horn of at least one of the ultrasonic welding machines.

It is the primary object of the present invention to provide for the ultrasonic high speed production of suitable non-woven fabric. This and other objects of the invention will become clear from an inspection of the detailed description of the invention, and from the appended claims.

BRIEF DESCRIPTION OF THE DRAWINGS

FIG. 1 is a side schematic view of exemplary apparatus according to the present invention;

FIG. 2 is a top plan schematic view illustrating an exemplary relative positioning of the ultrasonic horns of each of the ultrasonic welding machines of the FIG. 1 apparatus;

FIGS. 3a through 5a are linear developments of exemplary anvil rollers utilizable in the apparatus of FIG. 1;

FIGS. 3b through 5b are schematic plan views illustrating bonding points produced in a web utilizing the apparatus of FIG. 1 with the particular anvil rollers of FIGS. 3a through 5a, respectively; and FIG. 6 is a side schematic view of another embodiment of exemplary apparatus according to the present invention.

DETAILED DESCRIPTION OF THE DRAWINGS

Apparatus for effecting the formation of non-woven fabric from a batt 10 of random, loose, ultrasonically fusible fibers is illustrated generally by reference numeral 12 in FIG. 1. The apparatus 12 includes the conventional components of a batt formation apparatus 14, a batt conveying apparatus 15, and a take-up roller 16 for taking up formed fabric 18. According to the present invention, a plurality of ultrasonic welding machines are utilized, such as the welding machines 21, 22, and 23 illustrated in FIG. 1. Each welding machine 21 through 23 comprises a set (plurality) of conventional ultrasonic horns (25, 26, 27, respectively), and a cooperating anvil, such as anvil rollers 31, 32, 33, respectively. A common power source 34 provides energy to each of the plurality of horns 25, 26, 27 at the same time.

The apparatus 12 further preferably includes a plurality of feed roll systems 36, 37, 38 for effecting high-speed feeding of the batt 10 to each of the machines 21 through 23, in turn, to ultimately produce a non-woven fabric 18. The take-up roll 16 also is preferably powered at the same speed as the feed roll systems 36 through 38. Additional components for facilitating proper fabric formation may also be provided, such as apparatus for preventing significant migration of fibers in the batt just prior to bonding, such as shown in copending application Ser. No. 290,714 filed Aug. 6, 1981.

Each of the plurality of horns 25 through 27 is of conventional type, such as shown in U.S. Pat. No. 3,733,238, or may of the type shown in copending application Ser. No. 145,833 filed May 1, 1980, now U.S. Pat. No. 4,311,540. While each of the plurality of horns associated with each machine 21 through 23 may be staggered with respect to each other, such as shown in U.S. Pat. No. 3,733,238, in order to avoid complicated mounting apparatus and provide easy access to each of the horns, according to the invention the horns of each of the machines 21 through 23 may be mounted in-line with each other and spaced in a dimension E substantially transverse to the feed direction A of the batt 10.

An exemplary relative spacing between the plurality of horns associated with each welding machine is illustrated schematically in FIG. 2. For clarity of illustration, the horns in FIG. 2 are shown spaced from each other a greater proportional distance than would probably be provided in actual practice. It is noted that with the horns of each set spaced as illustrated in FIG. 2, and with the horns of the various sets staggered with respect to each other in the direction A, essentially every portion of the batt 10 across the width thereof passes in operative association with at least one horn of at least one of the machines 21 through 23. Note that each of the lines B, C, D in FIG. 2 passes through a gap between horns in one of the sets, but intersect a horn of at least one of the other sets.

The rollers 31 through 33 are rotatable about substantially parallel horizontal axes, each axes extending in the dimension E (see FIG. 2). Proper registry between each of the rollers 31 through 33 is always provided, and they are driven in synchronization with each other. A conventional synchronous drive 35 is provided for powering the rollers 31 through 33.

Each of the rollers 31 through 33 includes surface manifestations which cooperate with the horns 25 through 27, respectively, to provide primary bonding points. The surface manifestations preferably comprise a plurality of raised projections, each raised projection corresponding to a primary bonding point. The projections are disposed in a predetermined pattern, such as shown in U.S. Pat. No. 3,733,238 or copending application Ser. No. 145,833 filed May 1, 1980, now U.S. Pat. No. 4,311,540. Alternatively the rollers 31 through 33 also may be of the type that provide tack welds in the batt 10 at various fiber crossover points in addition to the primary bonds, such rollers being disclosed in copending application Ser. No. 318,799 filed Nov. 6, 1981 and entitled "ULTRASONIC PRODUCTION OF NON-WOVENS", the disclosure of which is hereby incorporated by reference herein.

FIGS. 3a through 5a illustrate very schematically linear developments of exemplary rollers that may be utilized for the rollers 31 through 33. Normally, many more bonding projections per unit area would be provided than are illustrated in FIGS. 3a through 5a, and the linear developments would be much larger both width-wise and circumferentially, in practice. The illustrations in FIGS. 3a through 5a are merely designed to show the general concept.

The roller 31 in FIG. 3a includes a plurality of upstanding projections 41 which are disposed in a right helical pattern. The roller 31 of FIG. 3a when cooperating with two other rollers 32, 33 also having a right helical pattern of projections 42, 43, produces the fabric illustrated in FIG. 3b. The projections patterns of rollers 32 and 33 are offset from the pattern of roller 31, and each other, in dimension E.

The bonding points produced by the projections 41 (cooperating with the horns 25) produce the bonding points illustrated by circles, and reference numerals 51, in the fabric 18 of FIG. 3b. The corresponding projections of the roller 32 (cooperating with horns 26) would produce the bonding points illustrated by xs, and reference numerals 52, in FIG. 3b, while the projections associated with roller 33 (cooperating with horns 27) would produce the bonding points illustrated by triangles and reference numerals 53 in FIG. 3b.

The roller 31' of FIG. 4a is comparable to the roller 31 of FIG. 3a only the projections 41' are disposed in a straight-line pattern. This results in the fabric 18' illustrated in FIG. 4b, with reference numerals thereon corresponding to those in FIG. 3b (only followed by a "'") referring to corresponding bonding points. The roller 31" illustrated in FIG. 5a is comparable to the roller 31 only the projections 41" are disposed in a left helical pattern, and produce the fabric 18" illustrated in FIG. 5b, with reference numerals the same as in FIG. 3b (only followed by a "''") illustrating corresponding structures. Of course many other different types of patterns can be provided depending upon the particular fabric to be produced, roller availability, and the like.

While the drawings illustrate three welding machines 21 through 23, and while that is presently considered to be the optimum number of welding machines, the invention may be practiced utilizing almost any practical number of welding machines. In general, "x" ultrasonic welding machines are provided, where "x" is a positive integer greater than one. Where "n" is the predetermined desired number of primary bonding points per unit area (e.g. the number of points 51 through 53 illustrated for the section of fabric 18 in FIG. 3b), it is desirable that each of the machines bonds approximately (n/x) primary points. Where each of the anvil rollers 31 through 33 has a number "Y" of raised projections (the number "Y" of raised projections 41 illustrated in FIG. 3a is 15), wherein "Y" is a positive integer greater than one and wherein "n" is evenly divisible by "Y", the relationship $(n/Y)=x$ is approximately true. However under some circumstances it may be desirable to vary the number of bonding projections per roller so that some rollers effect bonding of more primary bonding points than others.

In FIG. 6 a modification of the apparatus according to the invention is illustrated, common components to the FIG. 1 embodiment being indicated by the same reference numeral only preceded by a "1". In this embodiment, one or more horn and anvil arrangements (preferably the middle horn 126 and anvil 132 of a three-welding machine arrangement) are inverted with respect to the other welding machines. Where more than three welding machines are provided, preferably every other horn and anvil set would be inverted with respect to the previous set.

The arrangement illustrated in FIG. 6 may have advantages over that illustrated in FIG. 1 as far as slightly increasing fabric strength and balancing the face-to-back effect commonly experienced in ultrasonic bonding. The face of the batt 110 that engages the horn (e.g. 125, 126, 127) experiences a degree of secondary bonding, and thus normally exhibits a smoother appearance than the face of the batt 110 facing the anvil (e.g. 131, 132, 133). The apparatus of FIG. 6 provides a balancing action so that both the face and the back of the final non-woven fabric 118 are provided with a more equal opportunity to experience secondary bonding. This may also provide a minor increase in fabric strength.

The horns of each welding machine 121, 122, 123 are offset in the dimension E, substantially transverse to the feed direction A of the batt 110, in the same manner as for the FIG. 1 embodiment.

Operation

Exemplary apparatus according to the present invention having been described, a method of producing a non-woven fabric 18 from a batt 10 of random, loose, ultrasonically fusible fibers utilizing the apparatus 12, will now be described with respect to the exemplary embodiment of the invention illustrated in FIGS. 1, 2, and 3.

The batt 10 is formed by formation apparatus 14, and is fed by feed roll systems 36 through 38, conveyor 15, and take-up roll 16 in direction A into operative engagement, in turn, with each of the ultrasonic welding machines 21 through 23.

The batt 10 passes first between the anvil roller 31 and the plurality of horns 25 which provide one-third of the ultimate number of desired primary bonding points in the fabric 18 to be produced. Energy is supplied from power source 34 to each of the machines 21 through 23 at the same time. The batt then passes between the anvil roller 32 and the horns 26, which effect bonding of approximately a second third of the primary bonding points. Subsequently, the batt passes between the anvil roller 33 and horns 27 wherein approximately the last third of primary bonding points are bonded, resulting in the production of a non-woven fabric 18 having the desired textile-like hand and drape, with high tensile strength, elongation, and tear strength properties. The fabric 18 (see FIG. 3b in particular) can be produced at high speed, typically well in excess of 50 meters/minute (e.g. about 150 meters/minute with the apparatus 12 illustrated in the drawings).

It will thus be seen that according to the present invention a method and apparatus have been provided for the high speed formation of a good quality non-woven fabric from a batt of random, loose, ultrasonically fusible fibers.

While the invention has been herein shown in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of producing a non-woven fabric from a batt of random, loose, ultrasonically fusible fibers utilizing a plurality of ultrasonic welding machines spaced from each other in a batt feed direction, the fabric having a predetermined number of primary bonding points per unit area formed with the ultrasonic welding machines, said method comprising the steps of:

(a) feeding the batt of fibers in the feed direction into operative engagement, in turn, with each of the ultrasonic welding machines;

(b) supplying energy to each of the ultrasonic welding machines to effect formation of primary bonding points therewith; and (c) effecting bonding of substantially less than all of said predetermined number of primary bonding points per unit with each of the ultrasonic welding machines but so that together the machines provide all of said predetermined number of bonding points.

2. A method as recited in claim 1 wherein x ultrasonic welding machines are provided, wherein x is a positive integer greater than 1; and wherein step (c) is practiced so that each of the machines bonds approximately (n/x) primary bonding points wherein n is the predetermined desired number of primary bonding points per unit area.

3. A method as recited in claims 1 or 2 wherein said steps (a)–(c) are practiced so that the batt is fed to the machines and formed into fabric at a speed of about 50 meters/min. or greater.

4. A method as recited in claims 1 or 2 wherein step (c) is practiced so that each of the machines applies a pattern of primary bonds to the batt that is the same as the pattern supplied by each of the other machines, with each pattern offset from the other patterns in a dimension perpendicular to the batt feed direction.

5. A method as recited in claim 4 wherein each machine applies a straight-line pattern of primary bonding points.

6. A method as recited in claim 4 wherein each of the machines applies a left-helical pattern of primary bonding points.

7. A method as recited in claim 4 wherein each of the machines applies a right-helical pattern of primary bonding points.

8. A method as recited in claim 4 wherein at least some of said welding machines are inverted with respect to the other of said welding machines so that both faces of the batt are acted upon by both horns and anvils of welding machines.

9. A method as recited in claim 1 wherein at least some of said welding machines are inverted with respect to the other of said welding machines so that both faces of the batt are acted upon by both horns and anvils of welding machines.

10. Apparatus for effecting the formation of a non-woven fabric from a batt of random, loose, ultrasonically fusible fibers, comprising:
   a plurality of ultrasonic welding machines, each machine including at least one horn and an anvil roller;
   means for mounting said welding machines so that they are spaced from each other in a direction of batt feed so that the batt may pass between the horn and anvil of each;
   means for transporting the batt in the feed direction between the horns and anvil of each of said machines;
   means for supplying energy, to effect ultrasonic bonding, to each of said machines at the same time; and
   wherein each of said ultrasonic welding machines includes a plurality of horns, said horns of each machine being in-line with each other and spaced from each other in a dimension substantially transverse to said feed direction, and each horn of each machine is in cooperation with said anvil roller of said machine; and wherein the horns of at least one of said machines are staggered along said dimension substantially transverse to said feed direction with respect to the horns of at least one of the others of said machines, so that essentially every portion of the batt across the width thereof passes in operative association with at least one horn of at least one of said ultrasonic welding machines.

11. Apparatus for effecting the formation of a non-woven fabric from a batt of random, loose, ultrasonically fusible fibers, comprising: a plurality of x ultrasonic welding machines, wherein x is a positive integer greater than 1;
   each ultrasonic welding machine including at least one horn and an anvil roller, each of the anvil rollers including Y raised projections, where Y is a positive integer greater than 1, each raised projection corresponding to a primary bonding point;
   the non-woven fabric produced having approximately n primary points per unit area, wherein n is a positive integer evenly divisible by Y, and wherein the relationship n divided by Y equals x is approximately true;
   means for mounting said welding machines so that they are spaced from each other in a direction of batt feed so that the batt may pass between the horn and anvil of each;
   means for transporting the batt in the feed direction between the horns and anvil of each of said machines; and
   means for supplying energy, to effect ultrasonic bonding, to each of said machines at the same time.

12. Apparatus as recited in claim 11 wherein each of said ultrasonic welding machines includes a plurality of horns, said horns of each machine being in-line with each other and spaced from each other in a dimension substantially transverse to said feed direction, and each horn of each machine is in cooperation with said anvil roller of said machine; and wherein the horns of at least one of said machines are staggered along said dimension substantially transverse to said feed direction with respect to the horns of at least one of the others of said machines, so that essentially every portion of the batt across the width thereof passes in operative association with at least one horn of at least one of said ultrasonic welding machines.

13. Apparatus as recited in claim 12 wherein said horns are spaced very close together in said dimension substantially transverse to said batt feed direction.

14. Apparatus as recited in claim 11 wherein the raised projections on each of said rollers are provided in a pattern, the pattern of each of the rollers being identical to the patterns of the others, only each pattern offset from the others in a dimension perpendicular to the batt feed direction.

15. Apparatus as recited in claim 14 wherein each said pattern is a helical pattern.

16. Apparatus as recited in claims 12 or 10 wherein the raised projections on each of said rollers are provided in a pattern, the pattern of each of the rollers being identical to the patterns of the others, only each pattern offset from the others in a dimension perpendicular to the batt feed direction.

17. Apparatus as recited in claims 12 or 10 wherein the horns and anvils of at least one of said welding machines are inverted with respect to the horns and anvils of other welding machines so that both faces of the batt come into contact with both horns and anvils during non-woven fabric formation.

18. Apparatus as recited in claim 11 wherein the horns and anvils of at least one of said welding machines are inverted with respect to the horns and anvils of other welding machines so that both faces of the batt come into contact with both horns and anvils during non-woven fabric formation.

19. An invention as recited in claims 2 or 11 wherein x equals 3.

20. Apparatus for effecting the formation of a non-woven fabric from a batt of random, loose, ultrasonically fusible fibers, comprising:

- a plurality of ultrasonic welding machines, each machine including at least one horn and an anvil roller;
- means for mounting said welding machines so that they are spaced from each other in a direction of batt feed so that the batt may pass between the horn and anvil of each;
- means for transporting the batt in the feed direction between the horns and anvil of each of said machines;
- means for supplying energy, to effect ultrasonic bonding, to each of said machines at the same time; and
- wherein the horns and anvils of at least one of said welding machines are inverted with respect to the horns and anvils of other welding machines so that both faces of the batt come into contact with both horns and anvils during non-woven fabric formation.

* * * * *